(12) United States Patent
Zeidler

(10) Patent No.: US 8,443,274 B2
(45) Date of Patent: May 14, 2013

(54) TEST CIRCUIT FOR TESTING EXECUTION OF A HANDSHAKE PROTOCOL AND METHOD FOR TESTING EXECUTION OF HANDSHAKE PROTOCOL

(75) Inventor: Steffen Zeidler, Berlin (DE)

(73) Assignee: IHP GmbH, Frankfurt (DE)

( * ) Notice: Subject to any disclaimer, the term of this patent is extended or adjusted under 35 U.S.C. 154(b) by 60 days.

(21) Appl. No.: 13/138,360

(22) PCT Filed: Jan. 18, 2010

(86) PCT No.: PCT/EP2010/050524
§ 371 (c)(1),
(2), (4) Date: Sep. 10, 2011

(87) PCT Pub. No.: WO2010/089179
PCT Pub. Date: Aug. 12, 2010

(65) Prior Publication Data
US 2011/0320895 A1      Dec. 29, 2011

(30) Foreign Application Priority Data

Feb. 6, 2009  (DE) .......................... 10 2009 000 698

(51) Int. Cl.
*G06F 11/00*          (2006.01)
(52) U.S. Cl.
USPC .......................................... 714/798; 709/237
(58) Field of Classification Search .................. 713/400;
709/224, 230, 237; 714/731, 749, 798
See application file for complete search history.

(56) References Cited

U.S. PATENT DOCUMENTS

| | | | |
|---|---|---|---|
| 5,550,848 A * | 8/1996 | Doshi et al. .................... | 714/749 |
| 6,178,450 B1 * | 1/2001 | Ogishi et al. .................. | 709/224 |
| 6,389,568 B1 * | 5/2002 | Leshay et al. ................. | 714/749 |
| 6,848,060 B2 * | 1/2005 | Cook et al. .................... | 713/400 |
| 7,447,963 B2 * | 11/2008 | Schuttert ....................... | 714/731 |
| 2003/0226083 A1 | 12/2003 | Yamanaka et al. ............ | 714/744 |

OTHER PUBLICATIONS

A. Peeters et al.; "Synchronous Handshake Circuits"; Asynchronous Circuits and Systems, Seventh International Symposium; Mar. 11, 2001; pp. 86-95; IEEE XP010537927; Piscataway, NJ, USA.
D. Shang et al.; "Low-cost Online Testing of Asynchronous Handshakes"; Test Sumposium, Eleventh IEEE Eruopean; May 21, 2006; pp. 225-232; IEEE XP010949588; Piscataway, NJ, USA.
D. Shang et al.; "On-line testing of Globally Asynchronous circuits"; On-line Testing Symposium, Eleventh IEEE International; Jul. 6, 2005; pp. 135-140; IEEE XP010831274; Saint Raphael, French Riviera, France.

\* cited by examiner

*Primary Examiner* — David Ton
(74) *Attorney, Agent, or Firm* — Ware, Fressola, Maguire & Barber LLP

(57) ABSTRACT

The present invention relates to a checker circuit for a handshake protocol. The checker circuit detects common errors that occur when two communication unit on execute the handshake protocol. The checker circuit is characterized by a compact circuit design that is associated with reduced susceptibility to circuit errors and a significantly reduced spatial requirement. The invention also relates to a method for checking the execution of the handshake protocol.

14 Claims, 10 Drawing Sheets

TEST CIRCUIT FOR TESTING EXECUTION OF A HANDSHAKE PROTOCOL AND METHOD FOR TESTING EXECUTION OF HANDSHAKE PROTOCOL

CROSS REFERENCE TO RELATED APPLICATIONS

This application is the U.S. National Stage of International Application No. PCT/EP2010/050524 filed on Jan. 18, 2010 which was published in German on Aug. 12, 2010 under International Publication Number WO 2010/089179, which International Application in turn claims the benefit of German Application No. DE 10 2009 000 698.2 filed Feb. 6, 2009.

BACKGROUND OF THE INVENTION

1. Technical Field

The present invention relates to a checker circuit for checking correct execution of a handshake protocol. The invention also relates to a method for checking correct execution of a handshake protocol.

2. Discussion of Related Art

Handshake protocols are used in asynchronous circuits to organize data transfer between two communication units that communicate asynchronously; the latter are also referred to hereinafter as "CUs". One group of handshake protocols ("single rail" or "bundled data" protocols) is based on "Request" signals, abbreviated hereinafter to "REQ", and on "Acknowledge" signals, abbreviated hereinafter to "ACK". In this group of protocols, a communication channel is provided for the actual data transfer between the communication units. The communication units are additionally connected to each other by two signal lines, with the REQ signal being set and read on one signal line and the ACK signal being set and read on the other signal line in order to control the transfer of data. A respective protocol signal (REQ or ACK) has the meaning of a "flag", i.e. a kind of Boolean variable that can be either LOW (logic zero) or HIGH (logic one). For example, the REQ signal is set by a first communication unit sending data, and the ACK signal is set by a second communication unit receiving data. The converse is also possible. By means of these protocol signals, the status of data transfer can thus be defined or queried by a communication unit.

When data is transferred in accordance with a handshake protocol from this group, a "push protocol", the first communication unit sets the REQ signal to HIGH as soon as there are data in the communication channel that are to be transferred from the first communication unit, thus indicating to the second communication unit that data are available to be received. When the data have been successfully received, the second communication unit set the ACK signal to HIGH. The first communication unit, for its turn, acknowledges reception of the ACK signal by deactivating the REQ signal.

Execution of a handshake protocol, also referred to simply as "communication" in the following, may be error-prone. The following are known examples of such errors:

"Stuck at" errors: A protocol signal from a communication unit is permanently LOW or HIGH.

"Premature transition" errors: Two consecutive signal changes (from LOW to HIGH or from HIGH to LOW) are too close together in time, i.e., the time between the two consecutive signal changes is less than the minimum permitted delay $\delta_{min}$.

"Order violation" errors: The order of signal changes does not conform to the order specified by the protocol.

Errors of the above kinds are obviously detrimental for data transfer between the communication units. It is therefore expedient to check for correct execution of a handshake protocol so that such errors can be detected and the appropriate response to the error type is performed.

A circuit for checking correct execution of a handshake protocol was first presented in 2005 in D. Shang et. al., "On-line testing of globally asynchronous circuits," Proceedings of the 11th IEEE international On-Line Testing Symposium (IOLTS '05), pp. 135-140, School of EECE, University of Newcastle-upon-Tyne, UK, July 2005. An advancement on this circuit was published in D. Shang et. al., "Low-cost online testing of asynchronous handshakes," in Proceedings of the Eleventh IEEE European Test Symposium (ETS '06), pp. 225-232, School of EECE, University of Newcastle-upon-Tyne, UK, May 2006.

The checking circuit presented in these two publications and shown schematically in FIG. 1 monitors checker components 11, 12, 13 and 14 for execution of the handshake protocol for two protocol signals (ACK and REQ), in each case with two possible signal changes (from LOW to HIGH, from HIGH to LOW) per signal change (per "phase"). The checker components are connected to each other via monitor circuits 15, 16, 17 and 18. The entire checker circuit thus comprises four checker components and four monitor circuits. The monitor circuits are used for process control and determine which checker component is active, depending on the state of handshake protocol execution.

The checker components of the known circuit each include a delay element, a d-flipflop and a small amount of combinatorial logic. The delay element is used to delay a protocol signal being checked, the value of which is written into the d-flipflop by a signal change in the respective other protocol signal. When the protocol operates free of errors, a logic one that propagates to the nearest monitor circuit and activates the nearest checker component is always stored in the d-flipflop. If the checked signal does not match the value prescribed by the protocol, a logic zero that prevents activation of the nearest checker component is written into the d-flipflop.

The structure of each checker component and monitor circuit is largely identical, except for an input circuit. The delay element integrated in a respective checker component, which may be composed of long inverter chains, for example, occupies a considerable area. Using multiple checker components and monitor circuits in a checker circuit thus involves a considerable area being required by the checker circuit. It is also generally known that the use of many identical components increases the susceptibility to errors and the amount of power required for circuit operation, which is basically disadvantageous. Another disadvantage of known checker circuits is that they are unable to detect any "order violation" errors 20, which arise when the protocol signals have the form shown in FIG. 2.

It is therefore an object of the invention to present a checker circuit for checking execution of a handshake protocol, which can be realized as an integrated circuit that occupies a particularly small area. Another object of the invention is to present a simplified method for checking execution of a handshake protocol.

DISCLOSURE OF INVENTION

According to a first aspect of the invention, the object is achieved by configuring a checker circuit, for checking correct execution of a handshake protocol, to receive a digital first input word, wherein a respective bit of the input word is formed by a respective protocol signal currently being logically assigned, and to detect a transition of the first input word into a second input word, generated by a change in logical assignment of one of the protocol signals.

The checker circuit according to the first aspect of the invention is also configured to compare the second input word with a digital comparison word on transition of the first input word into the second input word and to output externally an indicator for the presence of a protocol error, wherein a respective bit of the comparison word represents a logical assignment of the respective protocol signal after the transition, as expected according to the handshake protocol.

Finally, the checker circuit according to the first aspect of the invention is configured to change the comparison word after a defined delay time has elapsed after the transition of the first input word into the second input word, wherein a respective bit of the changed comparison word represents a next logical assignment of the respective logical protocol signal, as expected in accordance with the handshake protocol, after a renewed transition, which has not yet occurred, of the second input word into a third input word and wherein the defined delay time matches a time span whose duration according to the handshake protocol must lie between two changes to the protocol signal.

The checker circuit according to the invention allows correct execution of the handshake protocol to be checked using only a very small amount of circuit technology. In contrast to known circuits, this checker circuit does not involve a large number of identical checker components to check a single signal in each case, but can receive a plurality of protocol signals, concentrated in one input word, that are set by two communication units for the purpose of organizing asynchronous data transfer, and compare the input word with the comparison word predefined by the handshake protocol. More particularly, the checker circuit dispenses with using a plurality of delay elements, as a result of which the entire circuit occupies only a very small area and has a low power consumption. Another advantage of the compact structure of the checker circuit according to the invention is that it has a very low susceptibility to circuit technology defects. The checker circuit according to the invention is also configured to detect any order violation errors, thus improving the extent to which execution of a handshake protocol can be checked.

Some embodiments of the first aspect of the invention will now be described. The additional features of the embodiments may be combined with each other to form new types of embodiment of the invention, unless they are described otherwise.

Due to the comparison of the second input word with the comparison word that is performed on the first transition, the checker circuit is able in one embodiment to detect order violation errors and stuck-at errors. The checker circuit is configured in one embodiment, preferably in combination with the aforementioned functionality, to perform a comparison between the third input word and the unchanged comparison word, a comparison that is inevitably negative if the new transition of the second input word into the third input word occurs before the predefined delay time has elapsed. In this way, it is also possible for premature transition errors to be detected.

In one embodiment, the checker circuit includes a trigger unit, a delay unit, a memory and a comparator unit, the trigger unit being configured to detect the transition of the first input word into the second input word and to generate a trigger signal on the transition and to supply said signal to the delay unit and the comparator unit.

The delay unit is configured to delay the trigger signal by the defined delay time and to supply the delayed signal to the memory. The memory is configured to store the comparison word and to overwrite the comparison word with the changed comparison word on receiving the delayed signal.

Finally, the comparator unit is configured to compare one of the input words with the comparison word and to externally output a result of comparison as an indicator signal on receiving the trigger signal.

The delay unit may include a plurality of inverters connected in series, for example. The number of inverters then determines the defined delay time by which the delay unit delays a trigger signal. The reduced circuit complexity of the inventive checker circuit due to one use of the delay unit means that the circuit requires substantially less area than known circuits. For example, the inventive checker circuit according to this embodiment requires a mere third of the area, for a delay unit comprising about 50 inverters, that known circuits would need. The reduced number of components also results in lower power loss and reduced susceptibility to circuit errors.

In one alternative embodiment, the checker circuit comprises a trigger unit, a delay unit, a memory and a comparator unit. The trigger unit in this embodiment is configured to detect the transition of the first input word into the second input word and to generate a trigger signal on the transition and to supply said signal to the delay unit and the comparator unit.

The delay unit is also configured to delay the trigger signal by half of the defined delay time and to modify it, and to supply the modified delay signal to the memory and to the comparator unit, the modified delay signal having a signal width whose duration is half of the defined delay time.

The memory is configured to store the comparison word and to overwrite the comparison word with the changed comparison word on receiving the modified delay signal.

Finally, the comparator unit is configured to compare one of the input words with the comparison word and on receiving the trigger signal to selectively and externally output a result of comparison, or the modified delay signal, as an indicator signal.

This embodiment is very advantageous whenever the defined delay time that according to the handshake protocol must exist between two signal changes in the protocol signal is comparatively long. This embodiment is designed in such a way that the trigger signal need only be delayed by half the defined delay time, which also reduces the complexity of the delay unit by up to a factor of two, potentially, depending on the delay time. In this embodiment, a premature transition error can be detected in two ways:

1) If a new transition occurs before half of the defined delay time has elapsed, a comparison between an "old" comparison word and a "new" input word is carried out that is subsequently negative, so the comparator unit outputs the negative result of comparison (a logic one) as an indicator signal on receiving the trigger signal generated by the trigger unit, in order to indicate a protocol error.
2) If a new transition occurs after half and before the entire defined delay time has elapsed, the comparator unit outputs the modified delay signal as an indicator signal, in order to indicate a protocol error, on receiving the trigger signal generated by the trigger unit. In this case, the result of comparison would be positive, since the memory changes the "old" comparison word into a "new" one after half of the defined delay time has elapsed.

The trigger signal is mapped to a signal delayed by half of the delay time and with a signal width whose duration is about equal to half the delay time, for example by a delay unit comprising a logic OR gate, a logic AND gate and a delay member.

The trigger signal is supplied to a first input of the OR gate, and a first output signal from the OR gate is supplied to a first input of the AND gate and the delay member. The delay member is also configured to delay the first output signal by half the defined delay time and to supply it as the modified delay signal not only to the memory and the comparator unit but also, in inverted form, to a second input of the AND gate. Finally, a second output signal of the AND gate is supplied to a second input of the OR gate.

It is expedient if the checker circuit according to the invention is configured to transition to an inactive state on detecting a protocol error, with the checker circuit continuously indicating the presence of the protocol error while in the inactive state.

This can be achieved, for example, by the comparator unit being configured to supply a signal derived from the indicator signal to the trigger unit on receiving the trigger signal, and the trigger unit being configured not to generate any trigger signal on receiving the derived signal.

Due to the signal derived from the indicator signal being fed back, the checker circuit according to the invention no longer responds when a protocol error is detected, i.e. it is inactive. As a consequence, the checker circuit remains in the state it was in when the detected protocol error occurred. The state of the circuit can thus be easily checked with a synchronously operating test apparatus.

It is expedient if the checker circuit is configured in one embodiment to receive a reset signal externally, to transition from an inactive state to an initial state on receiving the reset signal, and in the initial state to output an indicator signal in response to a change in the logical assignment of any of the protocol signal.

By means of the reset signal, the checker circuit of the invention can be switched by external remote access to an initial state, for example before the checker circuit is put into service, or after a protocol error is detected. The state of the circuit can thus be easily checked with a synchronous test apparatus.

In another embodiment of the checker circuit according to the invention, the trigger unit is preferably configured to receive a first clock signal externally and to generate a trigger signal on each positive and/or negative clock edge of the first clock signal and to supply said signal to the delay unit and to the comparator unit.

In one embodiment, the checker circuit is additionally and advantageously configured to output the comparison word externally. In this way, it is possible to read out the state of the memory.

By supplying the external first clock signal and reading off the externally outputted comparison word, it is possible to verify that the checker circuit is working correctly and that the memory is correctly assigned both before and during operation.

In another embodiment, the configured to generate a count signal whenever there is any change in a logical assignment of any particular one of the protocol signals, and to output said count signal externally.

The externally outputted count signal may be detected by another digital circuit in order, for example, to count the number of signal changes in the specific protocol signal. In this way, a stuck-at error can also be detected by another digital processing unit, thus increasing the reliability with which execution of the handshake protocol is checked.

The checker circuit according to the invention is specifically suitable for checking the execution of a handshake protocol based on "request" and "acknowledge" signals. In this case, a respective input word has two bits.

According to a second aspect of the invention, the object is achieved by an integrated circuit comprising a plurality of checker circuit according to the first aspect of the invention or one of the embodiments described herein.

It is very advantageous for simple checking of the status of the plurality of checker circuits in the integrated circuit of the second aspect of the invention that the integrated circuit includes a read-out line that serially connects the memories in the plurality of checker circuits to each other and ends at a read-out output of the integrated circuit.

A respective checker circuit of the integrated circuit is configured to receive a read-out signal externally and on receiving the read-out signal to interrupt checking the execution of the handshake protocol. It is also configured to receive a second clock signal and to effect output of a respective last bit of each word present in the memory of the respective checker circuit via the read-out line when the read-out signal is respectively applied on a positive and/or negative clock edge of the second clock signal, so that by simultaneously detecting the second clock signal and a signal at the read-out output of the integrated circuit, the logic states of the memories of the plurality of checker circuits can be sequentially detected.

This has the advantage that, to check the status of a respective checker circuit, the respective checker circuit does not necessarily have to be configured to output the comparison word externally. The memories of the plurality of checker circuits are connected to each other serially to form a "combined memory". At each clock of the second clock signal, a memory outputs a bit via the read-out line. One memory in the combined memory accepts one bit from the preceding adjacent memory and transfers one of its own bits to the next memory. The last memory in the combined memory consequently outputs the bits at the read-out output. Since both the second clock signal and the signals at the read-out output can be detected, the stream of signals at the read-out output can be assigned to logic states of the memories in the plurality of checker circuits.

With regard to the method aspect, the invention provides a method for checking correct execution of a handshake protocol, said method comprising the steps of: receiving a digital first input word, wherein a respective bit of the input word is formed by a respective protocol signal currently being logically assigned; detecting a transition of the first input word into a second input word, generated by a change in logical assignment of one of the protocol signals; in response to the transition, comparing the second input word with a digital comparison word, wherein a respective bit of the comparison word represents a logical assignment of the respective protocol signal after the transition, as expected according to the handshake protocol; and after a defined delay time has elapsed after the transition, changing the comparison word, wherein the respective bits of the changed comparison word represent a next logical assignment of the respective logical protocol signal, as expected in accordance with the handshake protocol, after a renewed transition, which has not yet occurred, of the second input word into a third input word, and wherein the delay time matches a predefined time span whose duration must lie between two changes to the protocol signal.

The method according to the invention also permits simple and efficient checking of the execution of the handshake protocol. Hence, it substantially shares the advantages of the checker circuit according to the first aspect of the invention.

BRIEF DESCRIPTION OF THE DRAWINGS

Other advantages of the invention shall now be explained in the following description of some embodiments, with reference to the Figures, which show in schematic view.

DETAILED DESCRIPTION

Figure 1:
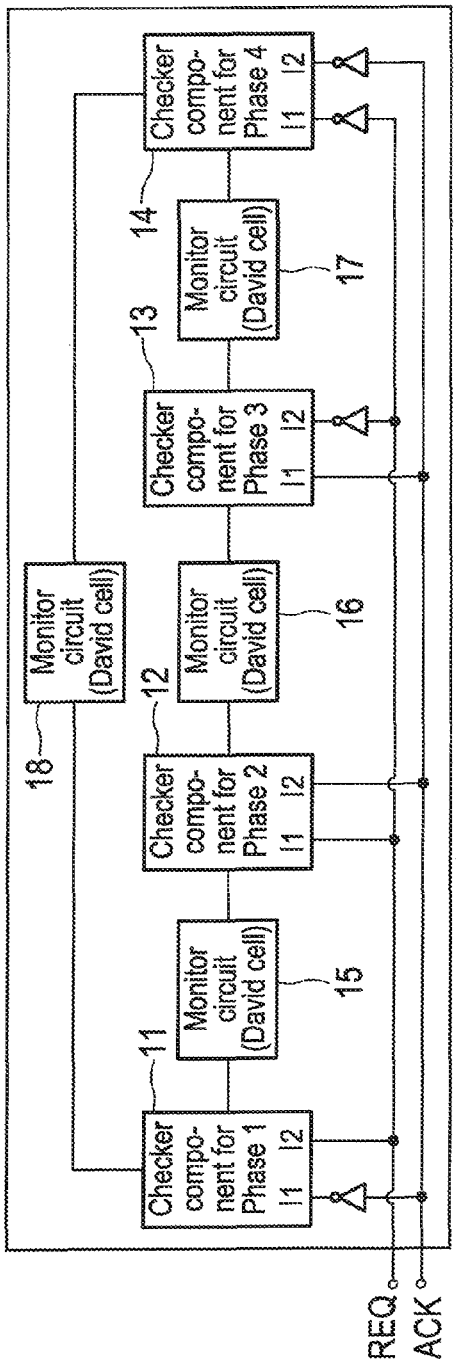
FIG. 1 a circuit design of a checker circuit according to the prior art.
Figure 2:
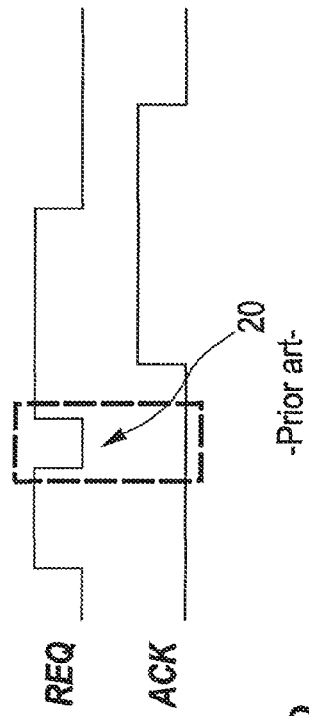
FIG. 2 a protocol signal error that cannot be detected as an error by a circuit according to FIG. 1, FIG. 3 a circuit design of an embodiment of the checker circuit according to the invention, FIG. 4 a circuit design of an alternative embodiment of the checker circuit according to the invention, with a modified delay unit, FIG. 5 a modified delay unit circuit, FIG. 6 a signal waveform illustrating how the delay unit in FIG. 5 operates, FIG. 7 a schematic circuit diagram of a memory and a sampler unit for sequentially checking the status of a plurality of checker circuits, FIG. 8 the circuit design of a memory element for sequentially checking the status of a plurality of checker circuits, FIG. 9 a combination of two memory elements for sequentially checking the status of a plurality of checker circuits, FIG. 10 a combination of a memory and a sampler unit for sequentially checking the status of a plurality of checker circuits, FIG. 11 an arrangement of a plurality of checker circuits for sequential status checking, FIG. 12 a circuit arrangement for checking execution of a handshake protocol with a checker circuit according to the invention, and FIG. 13 a circuit arrangement for checking two executions of a handshake protocol with a checker circuit according to the invention.
Figure 3:
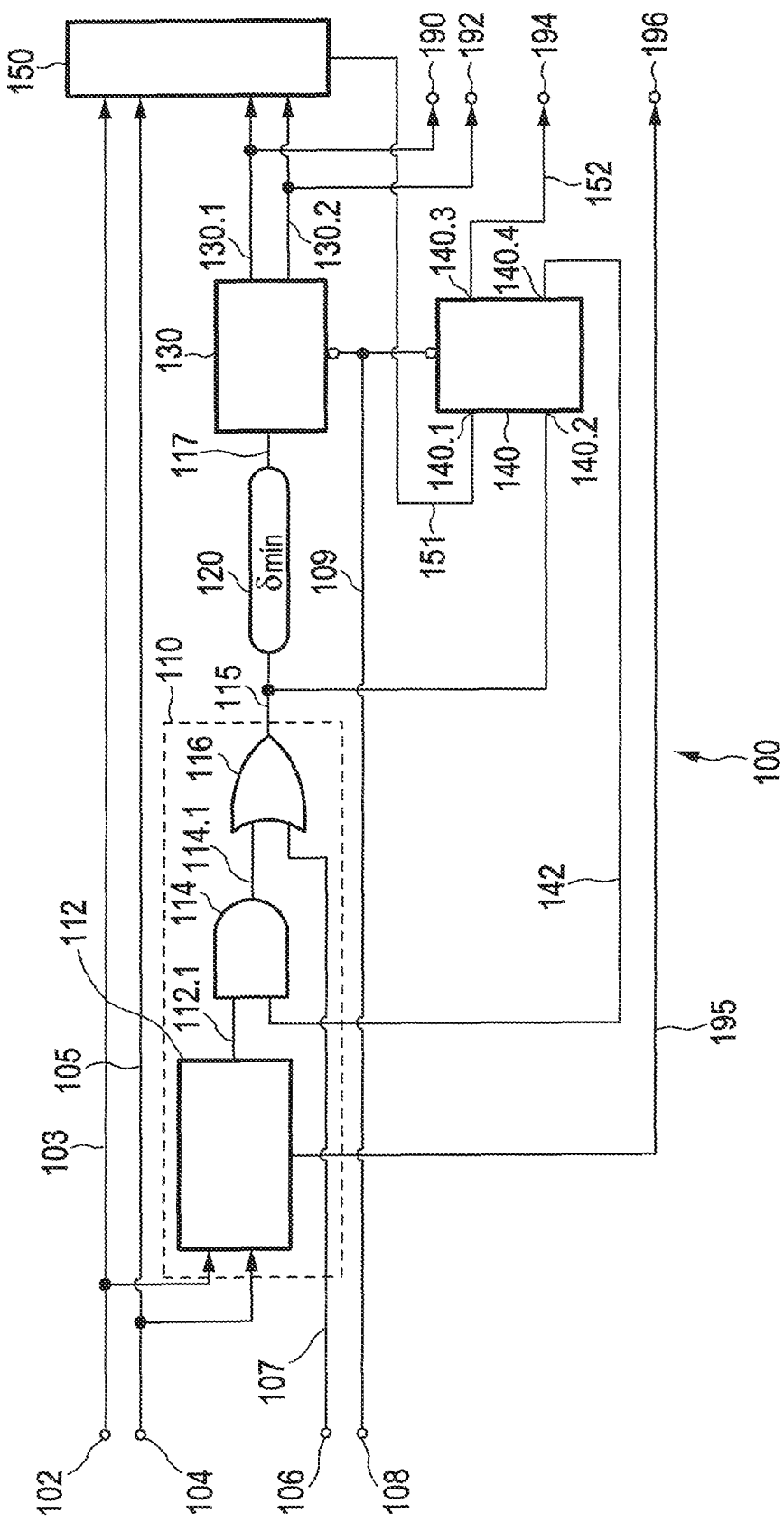

FIG. 3 shows an embodiment of the checker circuit according to the invention. A respective protocol signal 103, 105 from two communication units (not shown in FIG. 3) is supplied for checking to the checker circuit via a respective signal input 102, 104. The protocol signals may, for example, be the REQ signal and the ACK signal of a handshake protocol. As a basic principle, both the transmitting communication unit and the receiving communication unit may be the initiator of an asynchronous data transfer. This means that either the transmitting communication unit ("push protocol") or the receiving communication unit ("pull protocol") sets the REQ signal, and the receiving or transmitting communication unit then responds by changing the ACK signal. For the checker circuit according to the invention, it is all the same which of the protocol versions ("push" or "pull") is carried out by the communication units. The two protocol signals 103 and 105 form a digital input word with a width of two bits. On the input side, the checker circuit also includes a clock input 106 for an external first clock signal 107 and a reset input 108 for a reset signal 109.

The checker circuit comprises trigger unit 110, delay unit 120 which delays a trigger signal 115 from trigger unit 110 by a delay time $\delta_{min}$, a 2-bit shift register 130 which stores the comparison word, a comparator 150 and a sampler unit 140 realized as a d-flipflop. Comparator 150 and sampler unit 140 together form the comparator unit. A respective bit of the comparison word represents a logical assignment of the respective protocol signal, as expected according to the handshake protocol. Trigger unit 110 comprises a transition detection device 112, an AND gate 114 and an OR gate 116.

On the output side, the state of the shift register, i.e. a comparison word 2-bits in width, can be read at outputs 190 and 192. At an indicator output 194, the checker circuit outputs a result of comparison 151 from the comparator 150 as an indicator signal 152. The checker circuit also has a counter output 196.

Input word 103, 105 is supplied to both the comparator 150 and the trigger unit 110. When the input word transitions into a new input word by changing a logical assignment of a protocol signal, transition detection device 112 generates a transition signal 112.1 which is supplied as a trigger signal 115 via logic gates 114 and 116 to delay unit 120 and to a second input 140.2 of flipflop 140. The comparator compares the new input word with comparison word 130.1, 130.2. The result of comparison 151 from comparator 150 is supplied to a first input 140.1 of flipflop 140. On receiving trigger signal 115 at its second input 140.2, flipflop 140 outputs the result of comparison 151 as an indicator signal 152 via its second output 140.3 at indicator output 194. If a plurality of checker circuits according to the invention are integrated in a chip, a superordinate monitoring unit retrieves the status of a respective checker circuit by detecting the respective indicator signal.

If the comparison word 130.1, 130.2 is identical to the new input word, then the result of comparison 151 from the comparator 150 is a logic zero, otherwise a logic one. Checker circuit 100 thus detects stuck-at errors and order violation errors.

Shift register 130 consecutively alternates its state on receiving the delayed trigger signal 117. The new state of the shift register corresponds to a logical assignment of the input word, as expected in accordance with the handshake protocol after a renewed transition.

If the new transition of the input word occurs within the defined delay time $\delta_{min}$ after the first transition, the new input word is compared with the "old" comparison word due to the trigger signal 115 being delayed by delay unit 120, so the result of comparison is negative. Comparator 150 therefore outputs a logic one as the result-of comparison, which flipflop 140 subsequently outputs as indicator 152 at the indicator output 194. A premature transition error is detected in this manner.

If there are any of the aforementioned protocol errors, flipflop 140 outputs a logic zero at its second output 140.4, which is applied to the AND gate 114 of trigger unit 110. This results in checker circuit 100 remaining inactive until it is reset by remote access via reset input 108, since in the event of a protocol error the trigger unit no longer outputs any trigger signals due to feedback of the result of comparison.

Clock input 106 for an external first clock signal 107 is connected to the OR gate 116 of trigger unit 110, so a trigger signal is still outputted even when the first clock signal is at a HIGH level. By reading the shift register state at outputs 190, 192 and by supplying the first clock signal 107, it is possible to verify whether checker circuit 100 is functioning correctly.

Transition detection device 112 is likewise configured to generate a count signal 195 and to output same at counter output 196 whenever there is a change in a specified bit of the input word, i.e., whenever there is a change in a logical assignment of a specific protocol signal. These count signals can be detected by another processor unit, not shown in FIG. 3, which means that this processor unit can also recognize a stuck-at error.

Figure 4:
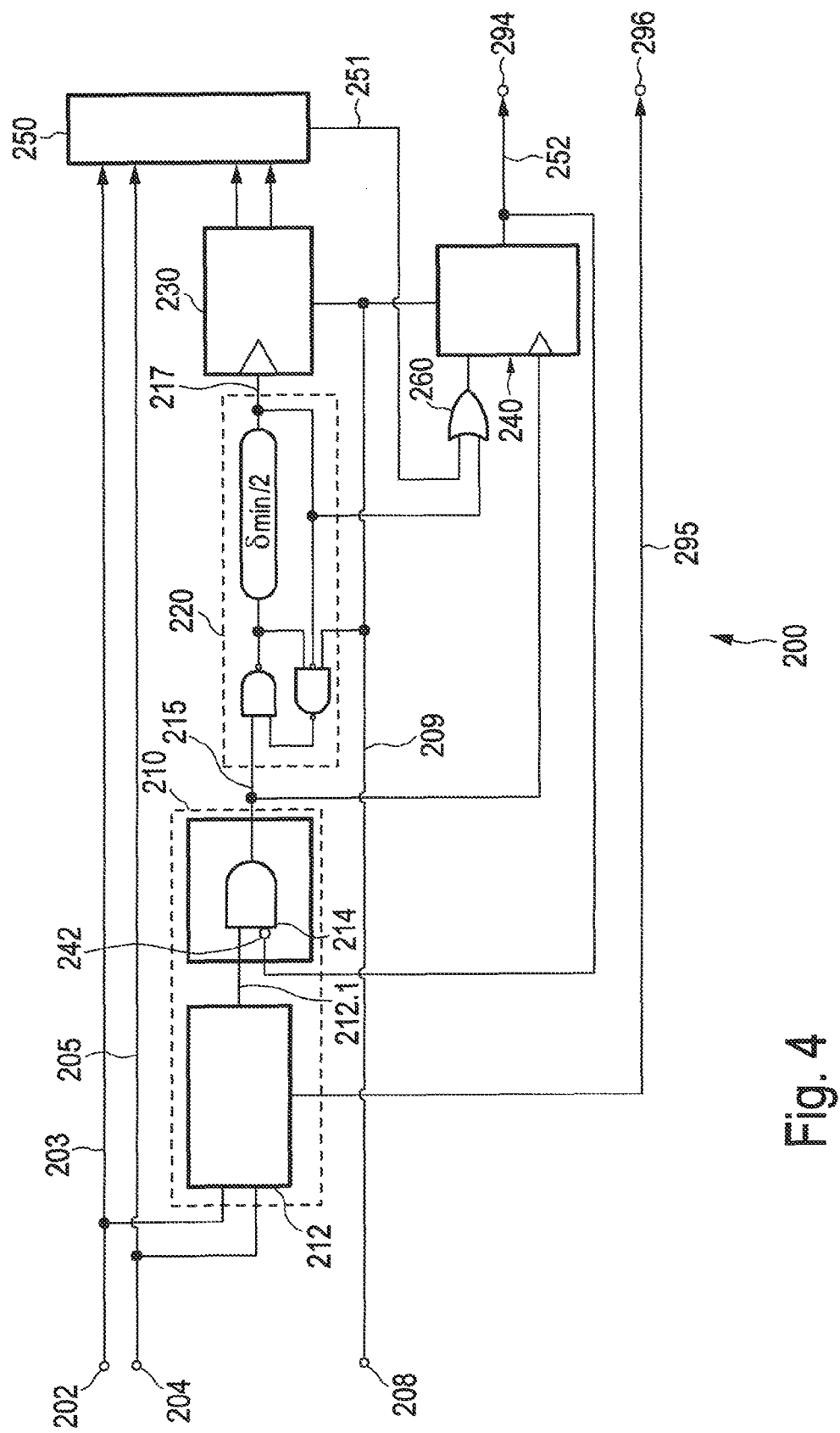

FIG. 4 shows a circuit design of an alternative embodiment of the checker circuit according to the invention, with a modified delay unit. A respective protocol signal 203, 205 from two communication units (not shown in FIG. 4) is supplied for checking to the checker circuit via a respective signal input 202, 204. Here, too, the protocol signals may be the REQ signal and the ACK signal of a handshake protocol, for example. As a basic principle, both the transmitting communication unit and the receiving communication unit may be the initiator of an asynchronous data transfer. This means that either the transmitting communication unit ("push protocol") or the receiving communication unit ("pull protocol") sets the REQ signal, and the receiving or transmitting communication unit then responds by changing the ACK signal. For the checker circuit according to the invention, it is all the same which of the protocol versions ("push" or "pull") is carried out by the communication units. The two protocol signals 203 and 205 form a digital input word with a width of two bits. On its input side, the checker circuit also includes a reset input 208 for a reset signal 209.

The checker circuit includes trigger unit 210 and delay unit 220. The delay unit 220 delays a trigger signal 215 from trigger unit 210 by half the delay time $\delta_{min}$ and outputs this signal as a modified delay signal 217 with a signal width whose duration is just about equal to half the delay time $\delta_{min}$.

Checker circuit 200 also includes a 2-bit shift register 230 which stores the comparison word, a comparator 250 and a sampler unit 240 realized as a d-flipflop. Comparator 250 and sampler unit 240 together form comparator unit 240, 250. A respective bit of the comparison word represents a logical assignment of the respective protocol signal, as expected according to the handshake protocol. Trigger unit 210 comprises a transition detection device 212 and an AND gate 214.

At an indicator output 294, the checker circuit outputs a result of comparison 251 from the comparator 250, or the modified delay signal 217, as an indicator signal 252. The checker circuit also has a counter output 296.

Input word 203, 205 is supplied to both the comparator 250 and the trigger unit 210. When the input word transitions into a new input word by changing a logical assignment of a protocol signal, transition detection device 212 generates a transition signal 212.1 which is supplied as a trigger signal 215 via logic gate 214 to delay unit 220 and to a second input of flipflop 240. The comparator compares the new input word 203, 205 with the comparison word in memory 230. The result of comparison 251 from comparator 250 is supplied together with modified delay signal 217 via an OR gate 260 to a first input of flipflop 240. On receiving trigger signal 215, flipflop 240 selectively outputs the result of comparison 251 or the modified delay signal 217 as indicator signal 152 at indicator output 194. If a plurality of checker circuits according to the invention are integrated in a chip, the status of a respective checker circuit can be retrieved by detecting the respective indicator signal.

If the comparison word in memory 230 is identical to the new input word, then the result of comparison 251 from the comparator 250 is a logic zero, and otherwise a logic one. Checker circuit 200 thus detects stuck-at errors and order violation errors.

Shift register 230 consecutively alternates its state on receiving the modified delay signal 217. The new state of the shift register corresponds to a logical assignment of the input word, as expected in accordance with the handshake protocol after a renewed transition.

If the new transition of the input word occurs within the defined delay time $\delta_{min}$ after the first transition, the transition detection device generates a new trigger signal 215. Since the modified delay signal 217 still has a HIGH level when the new change occurs, flipflop 240 outputs a logic one at indicator output 294 on receiving the new trigger signal 217, thus indicating a premature transition error.

The inverted indicator signal 242 is supplied to AND gate 214. This results in checker circuit 200 remaining inactive until it is reset by remote access via reset input 208, since in the event of a protocol error the trigger unit no longer outputs any trigger signals due to feedback of the indicator signal.

Transition detection device 212 is likewise configured to generate a count signal 295 and to output same at counter output 296 whenever there is a change in a specified bit of the input word, i.e., whenever there is a change in a logical assignment of a specific protocol signal. These count signals can be detected by another processor unit, not shown in FIG. 4, which means that this processor unit can also recognize a stuck-at error.

Figure 5:
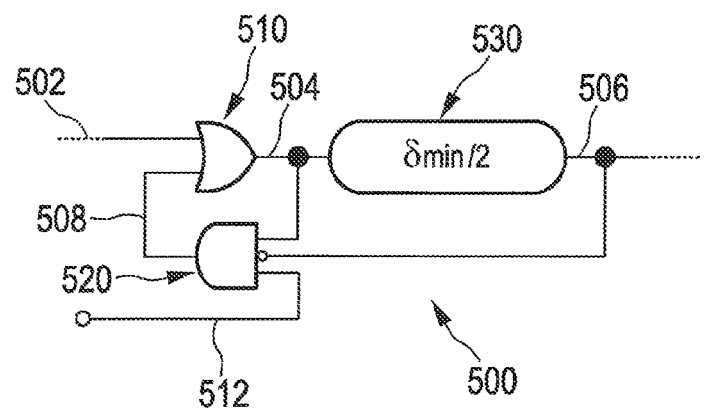

FIG. 5 shows a circuits of a modified delay unit 500. It comprises a logic OR gate 510, a logic AND gate 520 and a delay member 530, which are connected to form a ring structure with two feedback loops.

Trigger signal 502 from the trigger unit (not shown in FIG. 5) is supplied to the first input of OR gate 510. The first output signal 504 of OR gate 510 is supplied to the first input of AND gate 520 and to delay member 530. Delay member 530 is configured to delay the first output signal 504 by half the defined delay time and to supply it as modified delay signal 506 not only to the memory (not shown in FIG. 5) and to the comparator unit (not shown in FIG. 5) but also, in inverted form, to a second input of AND gate 520. Finally, a second output signal 508 from AND gate 520 is supplied to a second input of OR gate 510. Delay unit 500 can also be supplied a reset signal 512 via AND gate 520, said signal causing modified delay signal 506 to have a LOW level.

Figure 6:
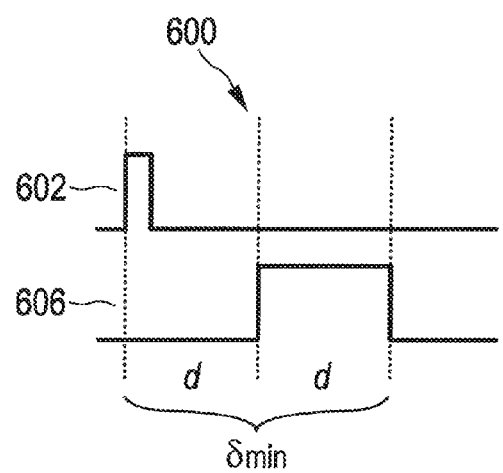

In order to illustrate the interrelationships, FIG. 6 shows an example of how the signals develop. Signal 602 is a trigger signal that the trigger unit generates on detecting a signal transition and supplies to delay unit 500. Signal 606 is the modified delay signal from the delay unit. Delay member 530 delay trigger signal 602 by half of the defined delay time $\delta_{min}$, i.e., by time d. The signal width of the signal thus delay by time d is also modified in such a way that its duration is equal to half the defined delay time $\delta_{min}$, i.e., to time d ($\delta_{min}/2$). Since this modified delay signal is supplied to the sampler unit of the checker circuit, the latter outputs an indicator signal, on receiving a trigger signal generated on the basis of a new transition of the input word, if the new transition occurred within delay time $\delta_{min}$.

Figure 7:
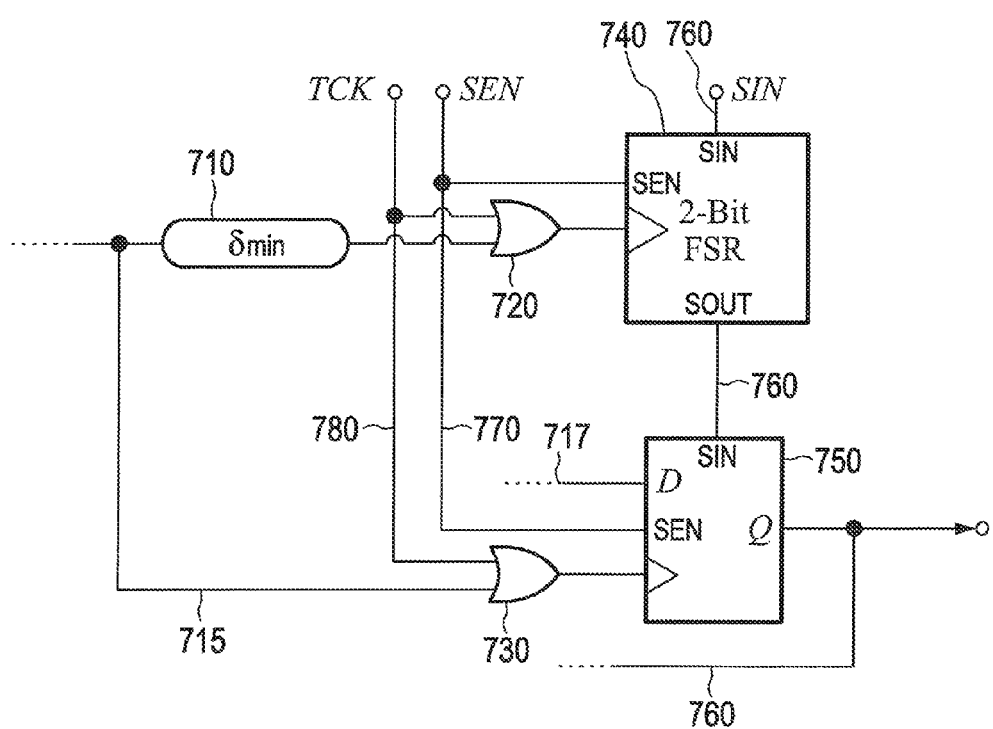

FIG. 7 shows a schematic circuit diagram of a memory 740 and a sampler unit 750 for sequentially checking the status of a plurality of checker circuits (not shown in FIG. 7). Read-out line 760 connects all the memories in the plurality of checker circuits and ends at a global read-out output. The plurality of memories form a kind of combined memory. One memory may be a shift register, for example, and thus may itself comprise a plurality of serially connected flipflops. As already explained with reference to FIG. 3 and FIG. 4, a comparator unit comprises, for example, a sampler unit 750 realized as a d-flipflop and a comparator (not shown in FIG. 7). Since such a sampler unit likewise constitutes a memory from the information technology perspective, it is integrated in the combined memory by laying read-out line 760 accordingly.

At each clock of the second clock signal 780, a memory outputs a bit via read-out line 760. One memory in the combined memory accepts one bit from the preceding adjacent memory and transfers one of its own bits to the next memory.

The last memory in the combined memory consequently outputs the bits at the read-out output. Since both the second clock signal and the signals from the read-out output can be detected, the stream of signals at the read-out output can be assigned to logic states of the memories in the plurality of checker circuits.

Figure 8:
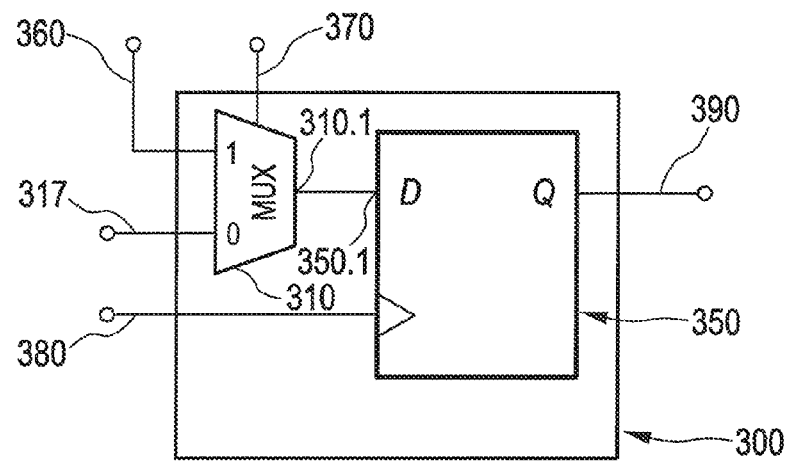

FIG. 8 shows the circuit design of a memory element 300 for sequentially checking the status of a plurality of checker circuits (not shown in FIG. 8). With the aid of such memory elements, the memory elements of the plurality of checker circuits can be combined to form one long combined memory that can be read out sequentially. Such a memory element includes a conventional flipflop 350 and a multiplexer 310. Multiplexer 310 switches one of its two inputs to input 350.1 of flipflop 350, according to read-out signal 370. Read-out line 360 is connected to a first input of multiplexer 310. Via this line 360, bits from a preceding memory elements can be supplied to flipflop 350 when the read-out signal is at a high or low level. If the read-out signal has the other level, i.e. high or low, a result of comparison from a comparator (not shown in FIG. 8) of the checker circuit is supplied to flipflop 350. In the first case, a respective checker circuit is in a "read-out mode", in the second case in a checker mode. Via line 380, a trigger signal or the second clock signal can be selectively supplied to flipflop 350. In read-out mode, the second clock signal is supplied to flipflop 350 via line 380. At each clock signal, flipflop 350 then takes over one bit from a preceding flipflop and outputs its own bit via line 390 either to the read-out output (not shown in FIG. 8) or to a subsequent flipflop. In checker mode, memory element 300 fulfills the function already described with reference to FIG. 3 and FIG. 4.

Figure 9:
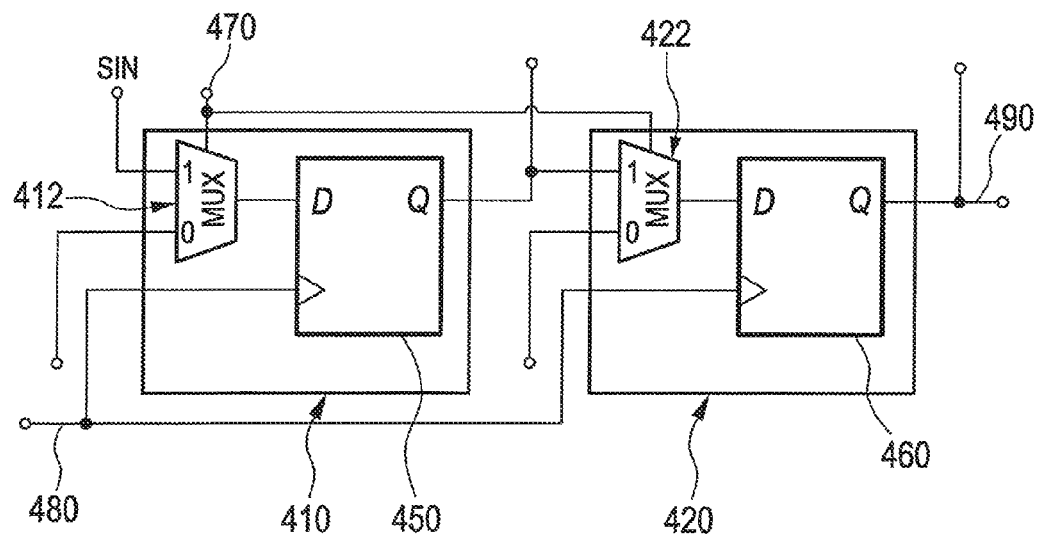

FIG. 9 shows a combination of two memory elements for sequentially checking the status of a plurality of checker circuits (not shown in FIG. 9). In this combination, it is all the same whether memory elements 410 and 420 belong to a single checker circuit or whether memory element 410 belongs to a first one of the plurality of checker circuits and memory element 420 to a second checker circuit.

The structure of a respective memory element 410/420 corresponds to that in FIG. 8. Both memory elements may be selectively placed in checker mode or in read-out mode by a read-out signal 470 supplied by a respective multiplexer 412/422. In read-out mode, the second clock signal is supplied to flipflop 450 via line 480. At each clock signal, flipflop 460 then takes over one bit from a preceding flipflop 450 and outputs its own bit via line 490 either to the read-out output (not shown in FIG. 9) or to a subsequent flipflop. In this way, the content of all the memory elements can be read out from all the checker circuits.

Figure 10:
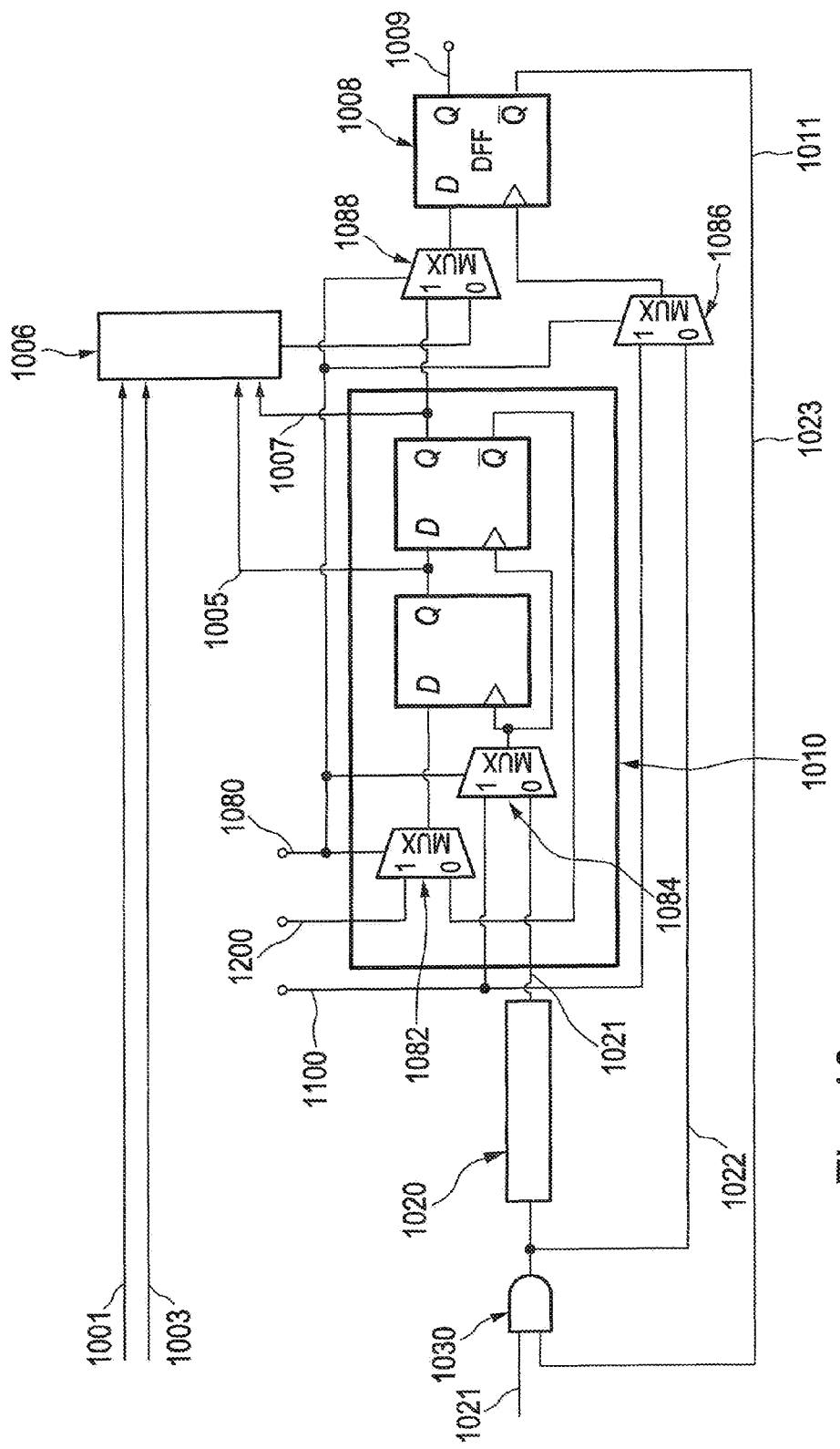

FIG. 10 shows a section from the circuit design of a checker circuit which is suitable for sequential status checking. The section includes comparator 1006, to which an 2-bit wide input word 1001/1003 and comparison word 1005/1007 of memory 1010 is supplied. The memory includes a 2-bit shift register. The section also shows an AND gate 1030 to which trigger signal 1021 and the inverted indicator signal 1011 are supplied. The output signal from AND gate 1030 is supplied to delay unit 1020. In checker mode, the circuit fulfills the function already described with reference to FIG. 3 and FIG. 4.

To switch the checker circuit to read-out mode (status checking), the circuit has a plurality of selector circuits 1082, 1084, 1086 and 1086, to each of which read-out signal 1080 is supplied. The circuit is also supplied a second clock signal 1100. An internal clock signal may be used for a synchronous circuit, in order to shift the content of the combined memory through the combined memory clock by clock, one bit at a time. In the case of an asynchronous circuit as shown here, which does not usually have a global clock signal, such a second clock signal must be separately supplied in order to operate a combined memory. Memory 1010 can take over and pass on bits from the preceding checker circuit via line 1200.

Depending on read-out signal 1080, either the delayed trigger signal 1021 or the non-delayed signal 1022 from the trigger unit, or the second clock signal 1100 is supplied to the memory elements with the aid of multiplexers 1084 and 1086. When the condition that the second clock signal 1100 is LOW in normal checker mode, and that the trigger unit does not transmit a pulse in read-out mode, is fulfilled, these two multiplexers, which have complex circuitry and are expensive, can be replaced by simple OR gates.

The checker circuits are in checker mode when checking asynchronous channels. After checking, the checker circuits are switched to read-out mode by the read-out signal, and the content of the memory elements of the checker circuit are read out sequentially by supplying the second clock signal via read-out line 1200, 1009.

Figure 11:
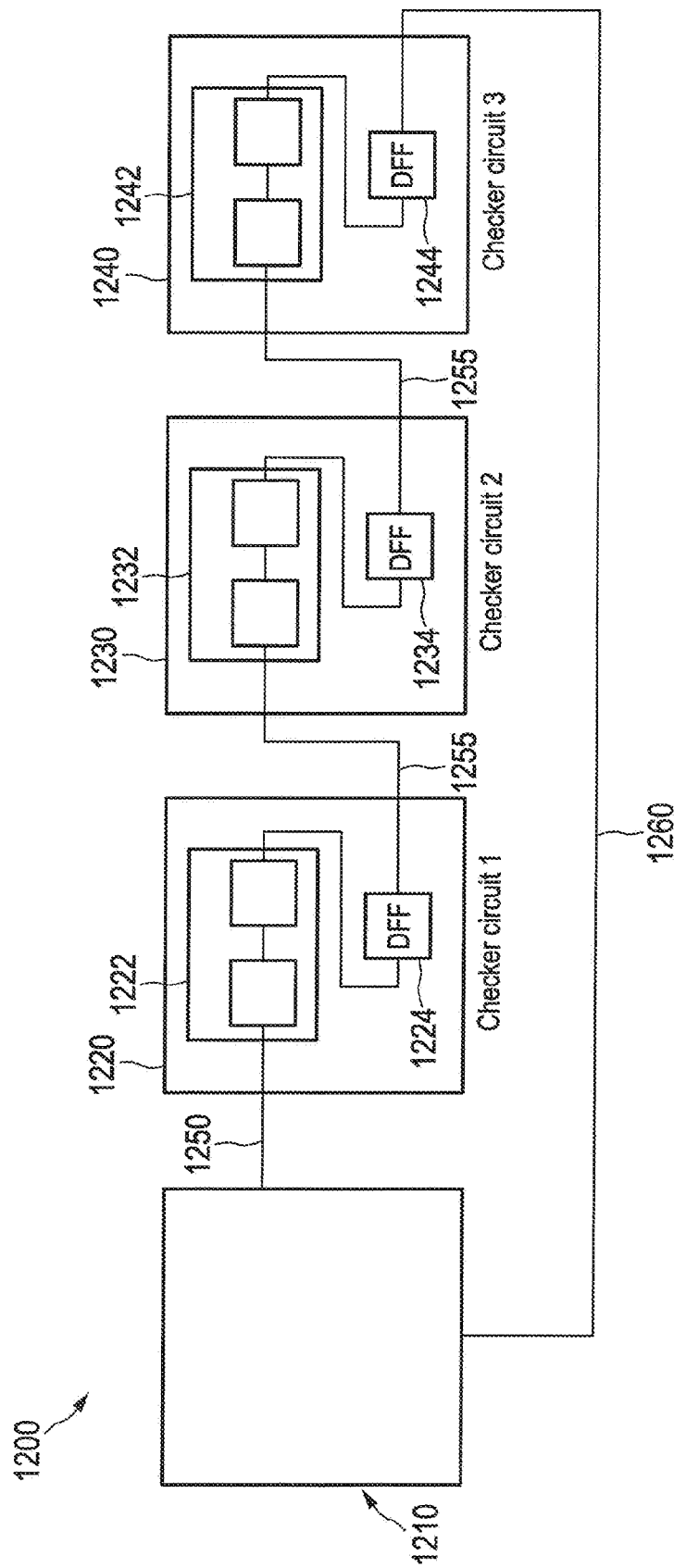

FIG. 11 shows a schematic arrangement 1200 of a plurality of checker circuits for sequentially checking status. All the memory elements in checker circuits 1220, 1230 and 1240, i.e., not only memories 1222, 1232 and 1234 for the comparison words but also the sampler units 1224, 1234 and 1244 realized as d-flipflops, are connected via read-out line 1255 to form a combined memory. In read-out mode, one bit is passed through the memory elements with each positive and/or negative edge of the second clock signal. A monitoring unit 1210 detects the second clock signal and also the signal at read-out output 1260. This arrangement is suitable for many checker circuits, as the status of each checker circuit can be determined very quickly.

Figure 12:
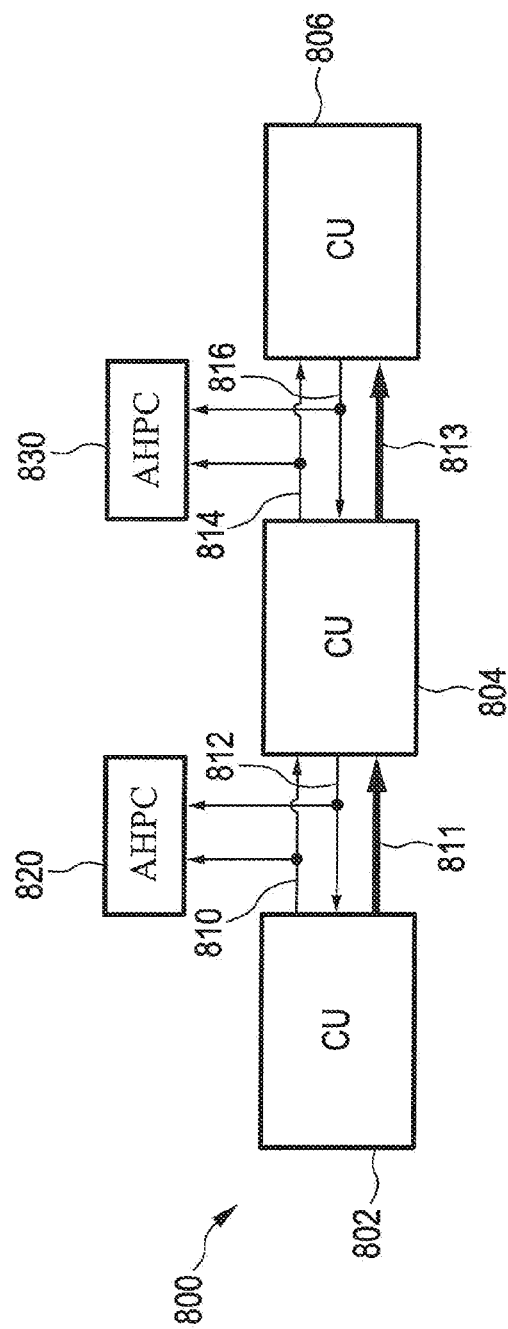

FIG. 12 shows a circuit arrangement 800 for checking a single execution of a handshake protocol by means of a checker circuit according to the invention. Two communication units (CUs) 802 and 804 (or 804 and 806) set and read protocol signals, for example the REQ signal and the ACK signal, on two signal lines 810 and 812 (or 814 and 816). The communication units exchange data via communication channel 811 (and 813). The respective protocol signals are sent for checking to a checker circuit 820 (or 830) according to the invention. This circuit arrangement is recommended in cases where communication channels 811 and 813 are distant from each other.

Figure 13:
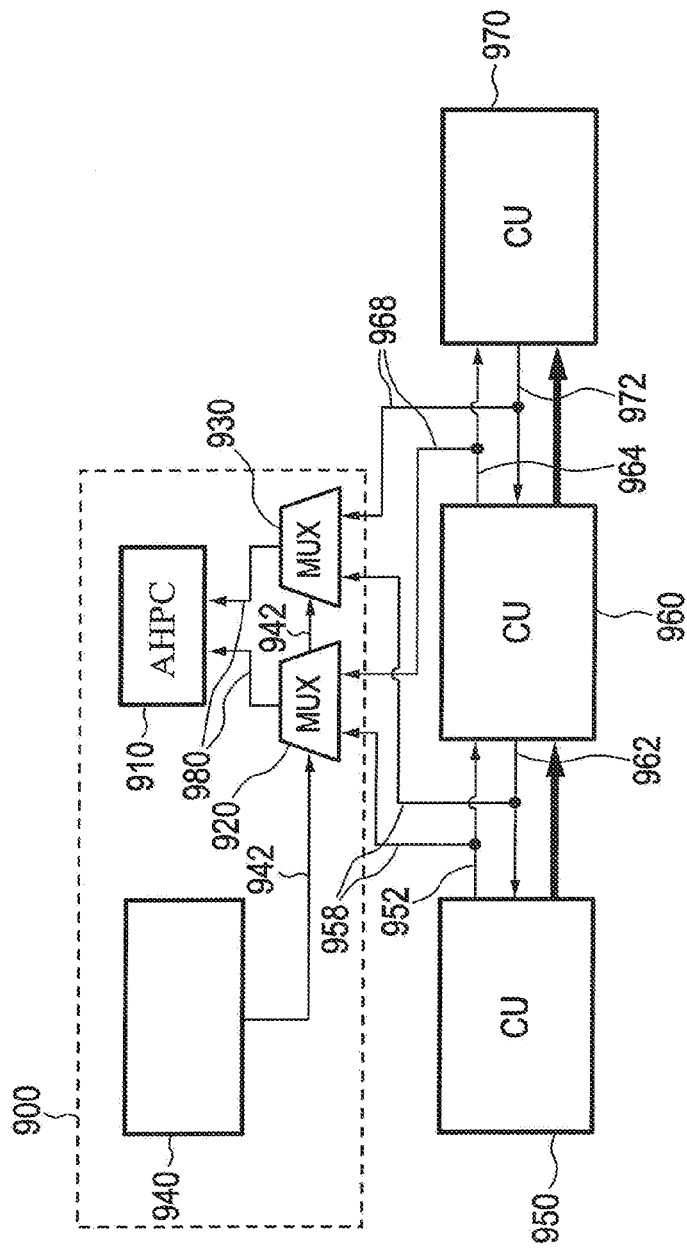

FIG. 13 shows a circuit arrangement 900 for checking two executions of a handshake protocol. Two communication units (CUs) 950 and 960 (or 960 and 970) set and read protocol signals, for example a REQ signal and an ACK signal in each case, on signal lines 952 and 962 (or 964 and 972). Of the total of four protocol signals, two are supplied in each case to a selector circuit 920 (or 930). Depending on a control signal 942 from a control unit 940, a respective selector circuit passes on one of its two input signals so that checker circuit 910 is supplied an 2-bit wide input word 980 for checking. Sequential checking of a plurality of executions of a handshake protocol by a single checker circuit is specifically recommended when communication units 950, 960, 970 are located not far from each other on one chip.

What is claimed is:

1. A checker circuit for checking whether a handshake protocol is correctly used, the checker circuit being configured to receive a digital first input word, wherein a respective bit of the input word is formed by a respective protocol signal currently being logically assigned;

to detect a transition of the first input word into a second input word by a change in logical assignment of one of the protocol signals;

to compare the second input word with a digital comparison word on the transition of the first input word into the second input word and to output externally an indicator for the presence of a protocol error, wherein a respective bit of the comparison word represents a logical assignment of the respective protocol signal after the transition, as expected according to the handshake protocol; and to change the comparison word after a defined delay time has elapsed after the transition of the first input word into the second input word, wherein a respective bit of the changed comparison word represents a next logical assignment of the respective logical protocol signal, as expected in accordance with the handshake protocol, after a renewed transition, which has not yet occurred, of the second input word into a third input word and wherein the defined delay time matches a time span whose duration must lie between two changes to the protocol signal in accordance with the handshake protocol.

2. The checker circuit (100) according to claim 1, comprising a trigger unit (110), a delay unit (120), a memory (130) and a comparator unit (140, 150), in which the trigger unit (110) is configured to detect the transition of the first input word into the second input word and to generate a trigger signal (115) on the transition and to supply said signal to the delay unit (120) and the comparator unit (140, 150);

the delay unit (120) is configured to delay the trigger signal (115) by the defined delay time and to supply the delayed signal (117) to the memory (130);

the memory (130) is configured to store the comparison word and to overwrite the comparison word with the changed comparison word on receiving the delayed signal (117); and the comparator unit (140, 150) is configured to compare one of the input words with the comparison word and to externally output a result of comparison (151) as an indicator signal (152) on receiving the trigger signal (115).

3. The checker circuit according to claim 2, in which the comparator unit (140, 150/240, 250) is configured to supply a signal (142/242) derived from the indicator signal (152/252) to the trigger unit (110/210) on receiving the trigger signal (115/215), the trigger unit being configured not to generate any trigger signal on receiving the derived signal (142/242).

4. The checker circuit according to claim 2, in which the trigger unit (110) is configured to received a first clock signal (107) externally and to generate a trigger signal (115) on each positive and/or negative clock edge of the first clock signal and to supply said signal to the delay unit (120) and to the comparator unit (140, 150).

5. The checker circuit according to claim 2, in which the trigger unit (110/210) is configured to generate a count signal (195/295) whenever there is any change in a logical assignment of any particular one of the protocol signal, and to output said count signal externally.

6. An integrated circuit comprising a plurality of checker circuits according to claim 2, said circuit including a read-out line (760) which serially connects the memories (740) of the plurality of checker circuits to one another and ends at a read-out output of the integrated circuit, wherein a respective checker circuit of the integrated circuit is configured to receive a read-out signal (770) externally and on receiving the read-out signal (770) to interrupt checking the execution of the handshake protocol; and to receive a second clock signal (780) and to effect output of a respective last bit of each word present in the memory (740) of the respective checker circuit via the read-out line (760) when the read-out signal (770) is respectively applied on a positive and/or negative clock edge of the second clock signal (780).

7. The checker circuit (200) according to claim 1, comprising a trigger unit (210), a delay unit (220), a memory (230) and a comparator unit (240, 250), in which the trigger unit (210) is configured to detect the transition of the first input word into the second input word and to generate a trigger signal (215) on the transition and to supply said signal to the delay unit (220) and the comparator unit (240, 250);

the delay unit (220) is configured to delay the trigger signal (215) by half of the defined delay time and to modify it, and to supply the modified delay signal (217) to the memory (230) and to the comparator unit (240, 250), the modified delay signal (217) having a signal width whose duration equals half of the defined delay time;

the memory (230) is configured to store the comparison word and to overwrite the comparison word with the changed comparison word on receiving the modified delay signal (217); and the comparator unit (240, 250) is configured to compare one of the input words with the comparison word and to selectively and externally output a result of comparison (251), or the modified delay signal (217), as an indicator signal (152) on receiving the trigger signal (215).

8. The checker circuit according to claim 7, in which the delay unit (220/500) includes a logic OR gate (510), a logic AND gate (520) and a delay member (530), wherein the trigger signal (502) is supplied to a first input of the OR gate (510);

a first output signal (504) of the OR gate (510) is supplied to a first input of the AND gate (520) and to the delay member (530), and the delay member is configured to delay the first output signal (504) by half of the fixed delay time and to supply said signal as the modified delay signal (217/506) not only to the memory (230) and the comparator unit (240, 250) but also, in inverted form, to a second input of the AND gate (520); and a second output signal (508) of the AND gate (520) is supplied to a second input of the OR gate (510).

9. The checker circuit according to claim 1, configured to transition to an inactive state on detecting a protocol error, wherein the checker circuit continuously indicates the presence of the protocol error while in the inactive state.

10. The checker circuit according to claim 9, configured to receive a reset signal externally, to transition from an inactive state to an initial state on receiving the reset signal and in the initial state to output an indicator signal in response to a change in the logical assignment of any of the protocol signal.

11. The checker circuit according to claim 1, configured to output the comparison word externally.

12. An integrated circuit comprising a plurality of checker circuits according to claim 1.

13. The checker circuit according to claim 1, wherein a respective input word comprises two bits.

14. A method for checking correct execution of a handshake protocol, comprising the steps of:

receiving a digital first input word, wherein a respective bit of the input word is formed by a respective protocol signal currently being logical assigned;

detecting a transition of the first input word into a second input word by a change in logical assignment of one of the protocol signal;

in response to the transition: comparing the second input word with a digital comparison word, wherein a respective bit of the comparison word represents a logical assignment of the respective protocol signal after the transition, as expected according to the handshake protocol; and after a defined delay time has elapsed after the transition: changing comparison word, wherein the respective bits of the changed comparison word represent a next logical assignment of the respective logical protocol signal, as expected in accordance with the handshake protocol, after a renewed transition, which has not yet occurred, of the second input word into a third input word, and wherein the delay time matches a predefined time span whose duration must lie between two changes to the protocol signal

* * * * *